(No Model.) 3 Sheets—Sheet 1.

I. L. SHELDON & G. F. BAILEY.
MACHINE FOR MAKING PAPER BOXES.

No. 410,033. Patented Aug. 27, 1889.

Witnesses
C. M. Newman
Bertha E. Lee

Inventors
Irving L. Sheldon and
G. Frank Bailey
By H. Wooster atty

N. PETERS, Photo-Lithographer, Washington, D. C.

(No Model.) 3 Sheets—Sheet 2.
I. L. SHELDON & G. F. BAILEY.
MACHINE FOR MAKING PAPER BOXES.
No. 410,033. Patented Aug. 27, 1889.
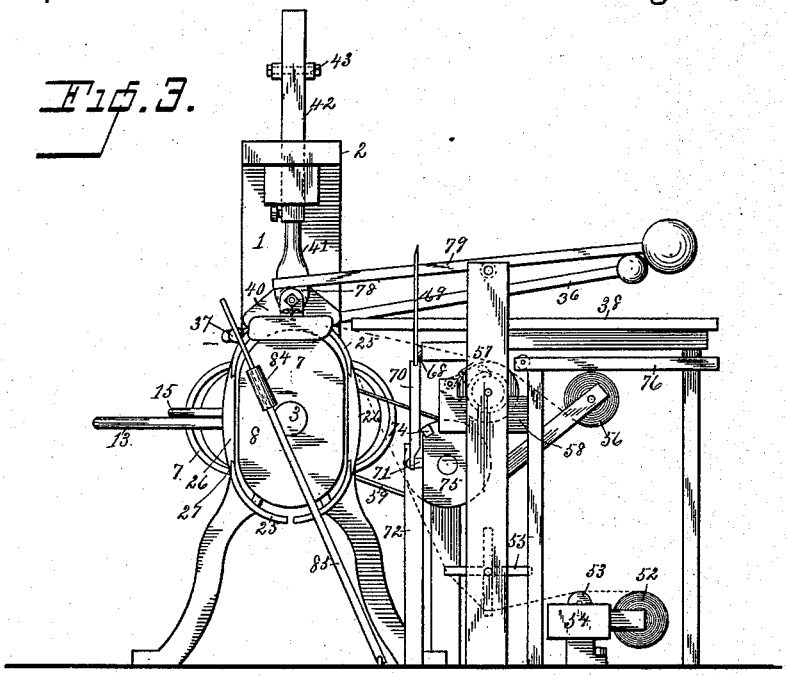
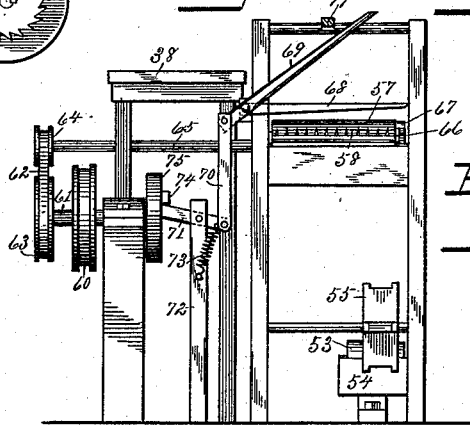
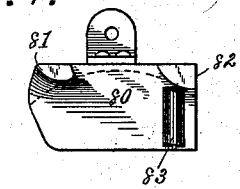
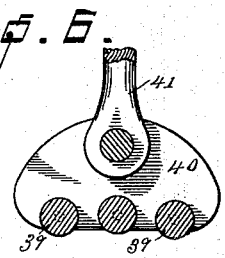
Witnesses
C. M. Newman
Bertha E. Lee
Inventors
Irving L. Sheldon
G. Frank Bailey
By H. M. Wooster atty.

(No Model.) 3 Sheets—Sheet 3.
I. L. SHELDON & G. F. BAILEY.
MACHINE FOR MAKING PAPER BOXES.
No. 410,033. Patented Aug. 27, 1889.
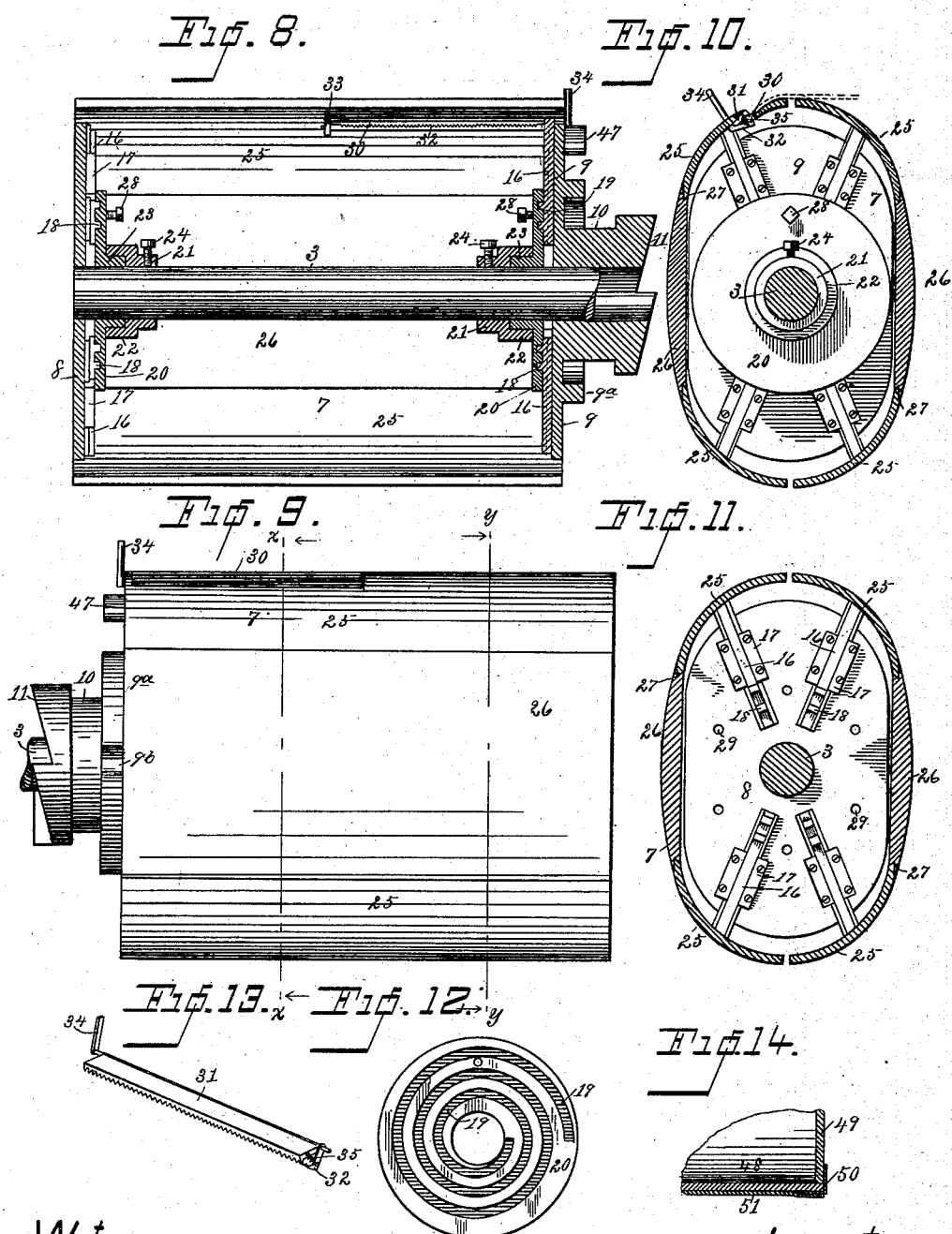
Witnesses
C. M. Newman
Bertha E. Lee.
Inventors
Irving L. Sheldon and
G. Frank Bailey
By A. M. Wooster Atty.

UNITED STATES PATENT OFFICE.

IRVING L. SHELDON AND GEORGE FRANK BAILEY, OF DANBURY, CONNECTICUT.

MACHINE FOR MAKING PAPER BOXES.

SPECIFICATION forming part of Letters Patent No. 410,033, dated August 27, 1889.

Application filed June 11, 1888. Serial No. 276,736. (No model.)

*To all whom it may concern:*

Be it known that we, IRVING L. SHELDON and GEORGE FRANK BAILEY, citizens of the United States, residing at Danbury, in the county of Fairfield and State of Connecticut, have invented certain new and useful Improvements in Machines for Making Paper Boxes; and we do hereby declare the following to be a full, clear, and exact description of the invention, such as will enable others skilled in the art to which it appertains to make and use the same.

Our invention has for its object to produce a machine of this class that shall be simple and durable in construction, easily managed and adjusted to form different sizes of boxes, and adapted to turn off neatly-finished work at a high rate of speed. With these ends in view we have devised the novel construction of which the following description, in connection with the accompanying drawings, is a specification, numbers being used to denote the several parts.

Figure 1:
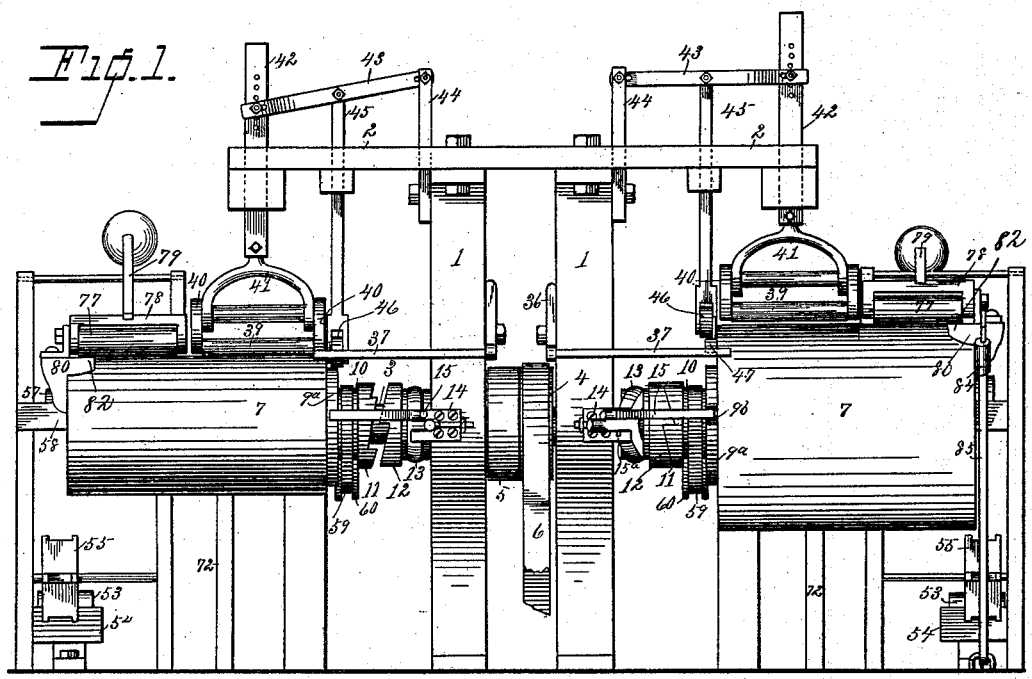
Figure 2:
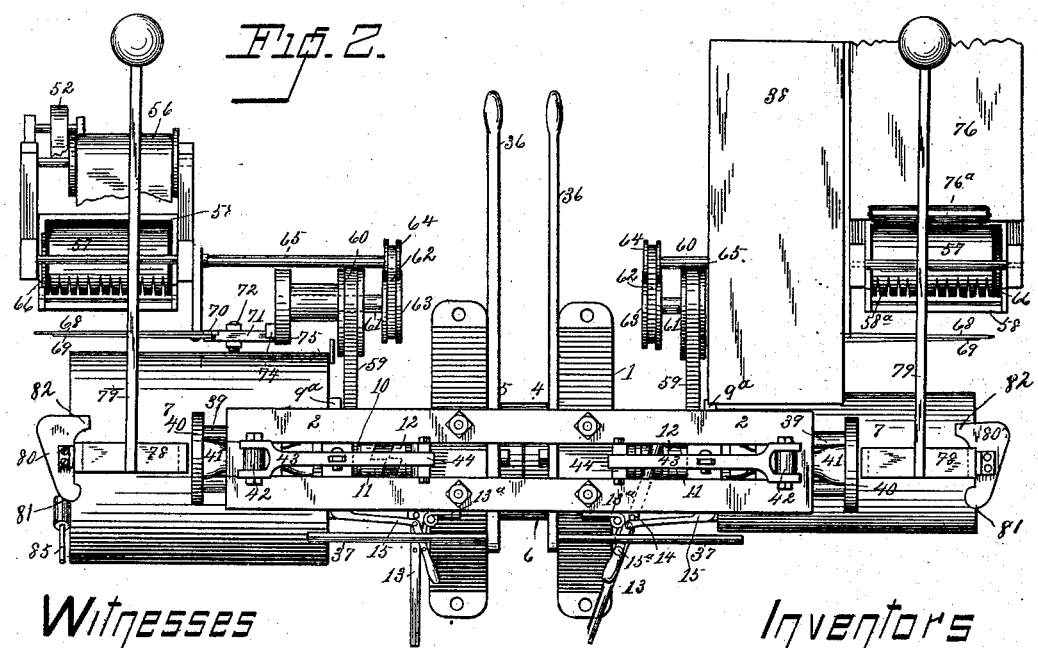

Figure 1 is a front elevation of a double machine, the right side only being in operation; Fig. 2, a plan view thereof, the feeding-tables on the left side being removed; Fig. 3, an end elevation as seen from the right in Fig. 1; Fig. 4, an elevation of the cutters, pasting-roller, clearing-fingers, &c., as seen from the left in Fig. 3, the forming-drums and frame-work by which they are carried being removed; Fig. 5, a detail of one of the pasting-roller ratchets; Fig. 6, a detail of the presser used in forming the body; Fig. 7, a detail of the folder and presser used in putting on the corner-strips; Fig. 8, a longitudinal section of the right forming-drum, the view being from the back; Fig. 9, an elevation of the right forming-drum; Fig. 10, a cross-section on the line $x\,x$ in Fig. 9, looking toward the left; Fig. 11, a cross-section on the line $y\,y$ in Fig. 9, looking toward the right; Fig. 12, a face view of one of the expanding disks at the ends of the forming-drums, showing the spiral groove; Fig. 13, a detail perspective of the grippers for the body-strip; and Fig. 14 is a section of the lower edge of a box, showing the different parts of which it is composed.

Similar numbers denote the same parts in all the figures.

1 denotes frame-work having a cross-piece 2 at the top, and 3 a shaft journaled in said frame-work and provided with fast and loose pulleys, (denoted, respectively, by 4 and 5.) In use this shaft is continuously in rotation, power being applied in any suitable manner, ordinarily by a belt 6, as shown in the drawings, which extends from a main or counter shaft. (Not shown.)

7 denotes the forming-drums at opposite ends of the shaft. The construction of these drums is fully illustrated in Figs. 8 to 13, inclusive.

8 denotes the outer end pieces, and 9 the inner end pieces. Upon the outer sides of the inner end pieces are flanges $9^a$, each having a slot $9^b$, and collars 10, which serve as belt-pulleys, and are provided at their outer ends with teeth 11, so that the collars also serve as the loose members of clutches, whereby the motion of shaft 3 is imparted to the forming-drums, all of which will be more fully explained. The other member of each clutch (denoted by 12) is keyed to the shaft, so as to be free to slide longitudinally thereon, but rotates continuously therewith. As this style of clutch is well known in various classes of machinery, we have not deemed it necessary to illustrate it in detail. The sliding member of each clutch is grasped in the usual manner by the arms of a bifurcated lever 13, pivoted to a bracket 14 on the frame-work.

15 is an angle-lever carried by lever 13, the outer end of which bears upon the flange $9^a$ on the end piece and engages notch $9^b$ to stop the rotation of the forming-drum after each revolution.

$13^a$ denotes a spring one arm of which bears against lever 13, and tends to throw it to the unlocked position. Angle-lever 15, however, is ordinarily locked to lever 13 by a pin $15^a$, which passes through both levers, so that they move together. This causes the outer end of the angle-lever to bear on the periphery of flange $9^a$, so that the sliding member of the clutch (denoted by 12) is held in engagement with teeth 11 on collar 10 until the outer end of angle-lever 15 drops into notch $9^b$. Levers 13 and 15 being rigidly secured together, as already explained, it follows that the instant the notch $9^b$ is reached spring 13ª will force the outer end of angle-lever 15 into it, which causes the inner end of lever 13 to swing inward, disengaging the sliding member of the clutch from teeth 11, and also stopping the rotation of the drum instantly. When levers 13 and 15 are secured together by pin 15ª, the stopping of the drum is automatic. When it is not desired to have this portion of the operation performed automatically, pin 15ª is not used. Both operations of the machine will presently be more fully explained.

16 denotes radial slides upon the inner sides of the end pieces, which are held in place by plates 17, and are provided with lugs 18, which engage grooves 19 in the outer faces of disks 20, which we term the "expanding disks." These disks are free to turn on the shaft and are held in position by collars 21, which are provided with overhanging flanges 22, engaging collar 23 on disks 20, col'ars 21 being rigidly secured to shaft 3 by set-screws 24, or in any suitable manner. The inner sides of the outer end pieces are identical in construction with the inner sides of the inner end pieces.

It will be seen that, while collars 21 hold disks 20 in operative position, they move independently of said disks, which are a fixed part of the drum and only rotate with it when the members of the clutch are connected, but collars 21 rotate continuously with the shaft.

It will of course be understood by those familiar with the art that ordinary classes of boxes—for example, hat-boxes—are made of certain regular sizes.

Instead of shifting the drums each time it is required to change the size of the boxes, we make the drums adjustable, so that any-sized box within reasonable limits can be made upon a single drum. This is accomplished in the manufacture of ordinary oval hat-boxes, the drums for which are the style we have selected to illustrate the principle of our invention, by making the periphery of the drum in six pieces and rigidly attaching four of said pieces to the radial arms which slide on the inner sides of the opposite end pieces.

25 denotes the four sections of the periphery of the drum which form the long diameters of the oval, and 26 the two interchangeable sections on opposite sides, which form the short diameters of the oval. These side sections are detachable and are provided with grooves 27 in their opposite edges, which engage the edges of sections 25, the outer periphery being always smooth and rounded. In changing the size of the drums the slides are moved outward by rotating the expanding disks. This moves sections 25 outward through the engagement of lugs 18 on the radial slides with spiral grooves 19 in the expanding disks and disengages sections 25 from sections 26. The latter sections are then removed and another section 26 of the desired size substituted in lieu of one of the former sections 26. The expanding disks are then rotated backward to place the edges of two of the sections 25 closely in engagement with the new section 26, and each disk is locked in position by a set-screw 28, which passes through the expanding disk and engages in one of a series of holes 29 in the end pieces, after which the other new section 26 is slid into place on the opposite side of the drum.

It will of course be understood that each section 25 is connected to one of the slides in each of the end pieces. These sections may, in fact, be termed the "corner sections." It will be noticed that as the size of the drum is increased the openings at the longest diameter between sections 25 will also be slightly increased. This, however, is immaterial, as the opening is so small as to have no effect in the formation of the boxes.

In the manufacture of square boxes sections 25 are of course made in the form of a right angle, and end sections corresponding with sections 26 can be used, if preferred. This being an obvious construction, is not deemed to require illustration.

30 is a slot in the inner half of each drum in one of the sections 25, in which the end of the strip of pasteboard is inserted in forming the body of each box. (See dotted lines, Fig. 10.)

Just within the slot is a fixed jaw 31 and a clamping-jaw 32, pivoted in the brackets 33 on the inner side of the section, one only of the brackets being shown. At the outer end of each pivoted jaw is a pin 34, by which said jaw is opened to release the strip, a spring or springs 35 acting to hold the pivoted jaw at the closed position.

36 denotes levers pivoted to the framework and having cross-pieces 37, which rest on the edges of the drums and are engaged by pins 34 to open the jaws at the completion of each revolution of the drums unless the cross-pieces have been lifted out of the way by the operator, who stands at the back. The normal action of each cross-piece is to engage the corresponding pin 34 at each revolution and open the jaws; but when lifted up away from the drum it will not engage the pin, so that the drum may be given any required number of revolutions without the body-strip being released from the jaws, as will presently be more fully explained. The rear ends of levers 36 are preferably slightly weighted, as shown, for convenience in operation. The forward ends, however, being heaviest, the cross-pieces always remain in position to engage pins 34 unless lifted out of the way.

It will be understood, of course, that when it is desired to have the drum make a number of revolutions lever 13 must be held at the instant notch 9ᵇ is reached, so that the inner end of lever 15 will not be forced into said notch by spring 13ª, as already explained.

Although we have shown a double machine in the drawings, it will of course be under stood that either drum may be used independently, if preferred. When both drums are used simultaneously, three operators are required to tend the machine, two being required when only one of the drums is used. In Figs. 1 and 2 the right clutch is engaged and the right forming-drum is in operation, the left clutch being disengaged and the left forming-drum not in operation.

It should be understood that in use the operation of each drum is wholly independent of the other. By connecting the two angle-levers 15 with the two levers 13 both drums are caused to stop automatically. When both of the forming-drums are in operation, one operator stands at the back of the machine and attends to the feeding for both drums, and an operator stands in front at each of the drums.

38 denotes a table upon the back of the machine for the use of the operator in feeding the strips from which the bodies of the boxes are formed. The operator glues each strip on the under side at the rear end. The strips are prepared a little in advance and the glue allowed to chill before they are used. The forward end of each strip is placed in the jaws and lever 13 moved outward to engage the two parts of the clutch. The engagement of the two members of the clutch causes the drum to be carried around by the shaft, the body-strip being wound around the drum and held in position by a suitable presser. (See Figs. 1 and 6.) This presser consists of one or more rollers 39, journaled in a frame or head 40. This frame is pivotally secured to a yoke 41, whose shank 42 is adapted to slide vertically in the frame-work.

43 is a lever one end of which is pivoted to shank 42 and the other to a bracket 44, projecting upward from the frame-work.

45 is a rod pivoted to the lever 43, about midway its length, and extending downward through the frame-work. At the lower end of this rod is a roller 46, which is adapted to engage a stump 47 on the outer face of the inner end piece of the drum.

It will be seen that as the drum rotates the presser will follow the curves of the drum and move up and down with it, thereby forming the body of the box on the drum, shank 42 sliding in the bearings.

As it is desirable that the presser should be lifted entirely away from the drum when the body-strip is inserted and removed, I have provided the stump and the roller carried by rod 45 to lift it automatically. When the roller rides up on this stump, rod 45 is raised and lifts lever 43, shank 42, the presser, &c., high enough so that the strip may be inserted and removed without difficulty. When the drum has made a revolution and the glued end of the body-strip has been stuck down upon the upper surface thereof, the pivoted jaw will have been swung downward in the manner described, so that the inner end of the body-strip may be slipped out from between the jaws.

The operation of this portion of the machine is briefly as follows: Suppose that it is desired to have the machine work automatically, angle-lever 15 is connected to lever 13 by pin $15^a$. Spring $13^a$ acts at all times to throw lever 13 inward, which throws the sliding member of the clutch to the disengaged position; but when the angle-lever is keyed to it the spring will act to press the inner end of the angle-lever against flange $9^a$, which will hold the sliding member of the clutch in engagement until notch $9^b$ is reached, when the inner end of angle-lever 15 will drop into it and stop the rotation of the drum, disengaging the clutch at the same instant. At the same instant presser roller or rollers 39 will be lifted away from the surface of the drum by the engagement of roller 46 with stump 47 on the outer face of the inner end piece, and pin 34 at the outer end of the pivoted jaw will be engaged by cross-piece 37, which is connected to lever 36 and rests upon the periphery of the drum. This will act to open the jaws. The completed body is now removed from the jaws by the operator and slid over to the outer end of the drum in position for the operation of covering and securing the bottom in place and a second body-strip is inserted in the jaws. Lever 36 is now pressed down to disengage cross-piece 37 from pin 34, and lever 13 is operated against the power of spring $13^a$ to place the sliding member of the clutch in engagement again, these operations being repeated continuously. Should it not be desired to stop the machine at the completion of the first revolution, lever 13 would be held at the instant the notch $9^b$ was reached to prevent the outer end of lever 15 from dropping into it, and lever 36 would be pressed down to raise cross-piece 37 out of engagement with pin 34. This of course would be repeated as many times as required. Should it be required continuously to rotate the drum more than once in the formation of each body, pin $15^a$ would be removed. This would leave the angle-lever and lever 13 disconnected, and spring $13^a$ would of course act to disconnect the sliding member of the clutch, this position of the parts being clearly shown at the left in Figs. 1 and 2. So long as it is required to keep the drum in rotation, the clutch would have to be kept in engagement by holding lever 13, cross-piece 37 being kept out of engagement with pin 34 by pressing down upon lever 36 at each revolution. As soon as it is desired to stop the drum, lever 13 is released, when spring $13^a$ will throw the clutch to the disengaged position. At the instant lever 13 is released lever 15 is pressed outward, so that the outer end will engage the flange and stop the drum as soon as notch $9^b$ is reached, levers 13 and 15 of course working independently.

The next operation is the securing of the bottom in place by means of the corner-strip and the attachment of the covering-strip, which operations are performed simultaneously. For convenience in description we have designated the body of the box as 48, the bottom as 49, the corner-strip as 50, and the covering-strip as 51. (See Fig. 14.). The corner-strip and covering-strip may either or both be fed to the machine from continuous strips and severed by cutters at each revolution of the drum, or independent strips of paper may be used for covering and corner strips.

In the drawings we have illustrated as clearly as possible both modes of applying the corner and covering-strips. When, as is usually the case, the corner strip is supplied to the machine in the form of a continuous strip, a roll of paper 52 is placed in any suitable position, and is passed over a paste-roller 53, supplied with paste from a trough 54, in which it turns.

55 is a four-armed roller, over which the strip passes and by which it is kept in contact with the paste-roller. When the covering-strip is supplied to the machine in the form of a continuous strip, a roll of paper 56 is placed in any suitable position and is passed over a paste-roller 57, supplied with paste from a trough 58, in which it turns. When either the covering-strip or the corner-strip, or both, are supplied in the form of a continuous strip, it is necessary that cutters be provided to sever the strips at each rotation of the drum.

68 denotes a stationary cutter, and 69 a pivoted swinging cutter, the principle of operation being that of an ordinary pair of shears, the strip or strips of paper passing between the cutters or blades. The shank of the pivoted cutter extends back from the pivotal point and is connected by a link 70 with a lever 71, pivoted to a standard or bracket 72. A spring 73, connected to the link and to the bracket, acts to draw the link downward to hold the pivoted cutter in the open position. The rear end of lever 71 is engaged at each revolution by a lug 74 on the outer side of a disk 75, carried by a shaft 61, the action of which is to carry down the rear end of lever 71, thereby raising the link and closing the pivoted cutter down upon the stationary cutter, which severs the strip or strips. When the material for covering the boxes is furnished in the form of independent strips, these strips are placed upon a table 76, provided for the purpose, and are fed over roller 76ª upon paste-roller 57 and covered with paste in precisely the same manner as when a continuous strip is used.

58ª denotes fingers made integral with a bar pivoted at the opposite ends of trough 58. These fingers rest upon the surface of the paste-roller 57 and act to prevent the strip from sticking to the roller and being carried around. The end of the strip in practice is picked up by the fingers and the strip passes up over the fingers in convenient position to be laid upon the surface of the box by the operator. In this form the cutters act only on the corner-strip. As already stated, the corner-strip also may be furnished in the form of independent strips, if preferred.

In practice we ordinarily use independent covering-strips and a continuous corner-strip. When independent covering-strips are used, we preferably rotate paste-roller 57 by means of a belt 59, extending from the belt-pulley on collar 10 on the inner end piece of the drum and over a belt-pulley 60 on a shaft 61. A belt 62 connects another pulley on shaft 61 (denoted by 63) with a pulley 64 on the paste-roller shaft 65. Paste-roller 57 is not secured to this shaft, but merely journaled thereon, and the motion of the shaft is communicated to the roller through a ratchet 66, keyed to the shaft, which is engaged by a pawl 67, attached to the side of the paste-roller. This is in order that when the long diameter of the forming-drum is drawing upon the covering-strip the paste-roller will be free to move ahead of the shaft and supply the paper as fast as required, the pawl dragging over the ratchet-teeth; and, furthermore, that when paper is being supplied to cover the sides of the box the roller will be automatically rotated to carry the paper forward. This independent motion of the paste-roller in connection with fingers 58ª insures that the end of each strip in starting will be carried forward into convenient position to be seized by the operator and laid upon the surface of the box, the strip being fed forward by the paste-roller until after it is well attached to the box.

The covering-strip, whether fed continuously or in the form of independent strips, is smoothed out and pressed to place upon the outside of the box by means of one or more presser-rollers 77, journaled in a suitable frame 78, pivoted at the forward end of a lever 79, which is journaled about midway its length in some convenient portion of the frame-work. The rear end of the lever is weighted, as shown, to partially counterbalance the weight of the head or frame. The head being heaviest, however, holds the roller in operative position unless lifted out of the way by means of the lever. In practice the roller is ordinarily made of rubber. The end strip is folded and pressed to place by a special folder and presser 80, which may be used independently, although in practice we preferably secure it rigidly to head or frame 78. This presser is shown in reverse view in Fig. 7. The strip is first folded over the corner by means of a projection 81, and is then firmly pressed to place by a projection 82, which acts upon the edge of the body of the box, and by the inner face of the presser itself, which bears against the edge of the bottom. In practice a roller 83 is preferably inserted in the face of the presser, the surface of the roller projecting slightly above the surface of the presser itself. The bottom of the box is laid against the outer end of the drum, and is held there by a roller 84, journaled on a rod 85, the lower end of which is joined to the frame-work or to the floor, as shown, in such a manner as to permit a free movement in any direction.

The operation of the machine has been already so fully described as hardly to require description in detail.

The bodies of the boxes are first formed on the inner end of the drum in the manner already described, and are then passed over to the outer end and the bottom attached in place by means of the corner-strip, and the covering-strip is laid on at the same time. This completes the operation of forming a box. The lids are made in precisely the same manner.

Having thus described our invention, we claim—

1. The combination, with a drum having a slot at its inner end to receive the end of the body-strip and a pair of jaws to hold it, of a presser having a shank adapted to slide vertically in the frame-work.

2. Shaft 3, drums mounted at opposite ends thereof, and clutches whereby the drums may be locked to the shaft independently of each other, in combination with pressers having rollers adapted to bear upon the drums, whereby the bodies of the boxes are formed.

3. Shaft 3, drums mounted at opposite ends thereof having slots 30, and jaws within said slots, and clutches whereby the drums may be locked to the shaft, in combination with the pressers having rollers adapted to bear upon the drums, whereby the bodies of the boxes are formed.

4. In a machine of the class described, the combination, with the shaft and the drums mounted at opposite ends thereof, of the clutches whereby the drums are connected and disconnected, levers 13, for operating the clutches, and angle-levers 15, carried thereby, which stop the rotation of the drums, substantially as described.

5. In a machine of the class described, the combination, with the shaft, of oval adjustable forming-drums 7, consisting of radially-sliding sections 25 and interchangeable side sections 26, whose edges engage the edges of sections 25.

6. The combination, with the shaft and end pieces 8 and 9, journaled thereon, of radial slides 16, having lugs 18, the expanding disks having grooves engaged by said lugs, sections 25, secured to the radial slides, and interchangeable sections 26, whose edges engage the other sections.

7. The combination, with the shaft, the end pieces journaled thereon, and slides 16, secured to the end pieces and having lugs 18, of sections 25 and 26, the expanding disks having spiral grooves engaged by the lugs, and set-screws which pass through said disks and engage the end pieces to lock the parts in position after adjustment.

8. The combination, with the shaft, the end pieces journaled thereon, sections 25 and 26, and radial slides secured to the end pieces and having lugs 18, of the expanding disks having spiral grooves engaged by said lugs and collars 23, and collars 21, secured to the shaft and having flanges extending over collars 23, whereby the expanding disks are held against endwise movement on the shaft.

9. The shaft, the end pieces journaled thereon and having holes 29, slides 16, having lugs 18, sections 25, carried by said slides, and sections 26, whose edges engage the edges of sections 25, in combination with the expanding disks having spiral grooves engaged by the lugs, and set-screws in said disks which engage the holes in the end pieces, as and for the purpose set forth.

10. In combination, the shaft, the end pieces, sections 25 and 26, the radial slides, the expanding disks, and collars 21.

11. In combination, the shaft, the end pieces, the radial slides, the expanding disks, and sections 26 and 25, one of said sections having a slot 30, and jaws within said slot, substantially as described.

12. The frame-work, the shaft, a drum having a slot 30, and fixed and movable jaws within said slot, said movable jaws having a pin 34, in combination with a lever 36, pivoted to the frame-work and having at its forward end a cross-piece which rests on the drum and engages pin 34 to open the jaws, and which may be lifted out of the way by pressing down the lever when it is not desired to open the jaws.

13. The combination, with a drum having a slot 30 and jaws within said slot, of a presser pivoted to a yoke and carrying a roller which follows the curves of the drum, and a vertically-moving shank to which the yoke is connected.

14. The drums having stumps 47 on their inner ends and the pressers carried by shanks 42, in combination with levers pivoted to the frame-work and to the shanks and having midway their length rods 45, carrying rollers 46, which engage the stumps, as and for the purpose set forth.

15. The drums having stumps 47, slots 30, and jaws within said slots, and the pressers carried by vertically-moving shanks and adapted to follow the curves of the drum, in combination with levers pivoted to the frame-work and to the shanks, and downwardly-extending rods pivoted midway of the levers and carrying rollers which engage the stumps, whereby the pressers are raised to insert and remove the body-strips from the jaws.

16. The drums having slots 30 at their inner ends and jaws within said slots which hold the ends of the body-strips, and pressers whereby the body-strips are formed about the drums, in combination with heads 78, carrying presser-rollers 77, and pivoted levers which carry said heads at the outer ends of the drums, whereby the bodies are first formed at the inner ends of the drums and then the covering-strips are put on while the second body is being formed.

17. The combination, with the drums, of rods 85, carrying rollers 84, whereby the box-bottoms are held in place, substantially as described.

18. The combination, with the drums and rods 85, carrying rollers 84, which hold the bottoms in place, of folders and pressers 80, whereby the end strips are folded and pressed in place to secure the bottoms to the bodies.

19. The combination, with the drums, of folders and pressers 80, having projections 81 to fold the corner-strips, and projections 82 and rollers 83, engaging, respectively, the bodies and the bottoms, whereby the corner-strips are pressed in place.

20. The combination, with the drums, of heads 78, carrying presser-rollers 77, and folders and pressers 80, secured to said heads, whereby the end strips and the covering-strips are simultaneously secured in place.

21. The combination, with the drums and rods 85, carrying rollers 84, whereby the bottoms are held in place, of folders and pressers 80 for the end strips, and heads 78, carrying presser-rollers 77 for the covering-strip.

22. The combination, with the drums having slots 30 at their inner ends and jaws within said slots, of pressers whereby the body-strips are formed about the drums, heads 78, carrying rollers at the outer ends of the drums, whereby the covering-strips are put on, and folders and pressers 80, whereby the corner-strips are put on to secure the bottoms to the bodies.

23. The combination, with shaft 3, the drums mounted thereon, shaft 61, shaft 65, and belts connecting said shafts, of a paste-roller mounted on shaft 65, a ratchet secured to said shaft, and a pawl on the paste-roller engaged by said ratchet, whereby the paste-roller is rotated at a predetermined speed and is permitted to move faster than its shaft when a long radius of the drum is drawing the covering-strip.

24. The shaft, a drum having a slot 30, and jaws within said slot, one of said jaws having a pin 34, a flange $9^a$, having a slot $9^b$, and a clutch for connecting the shaft and drum, in combination with a lever 13, for operating the clutch, a spring engaging said lever, whereby the clutch is connected, an angle-lever secured to lever 13 and engaging the flange, and a lever 36, having a cross-piece which engages pin 34, whereby at the completion of each revolution of the drum the clutch is automatically disconnected, the rotation of the drum is stopped, and the jaws are opened.

In testimony whereof we affix our signatures in presence of two witnesses.

IRVING L. SHELDON.
G. FRANK BAILEY.

Witnesses:
GEORGE B. BENJAMIN, Jr.,
HENRY C. RYDER.